US008938325B1

(12) United States Patent
McGinnis et al.

(10) Patent No.: US 8,938,325 B1
(45) Date of Patent: Jan. 20, 2015

(54) CONTROL SYSTEM FOR STABILIZING A SINGLE LINE SUSPENDED MASS IN YAW

(71) Applicants: William D. McGinnis, Blairsville, GA (US); Randall J. Whitehead, Panama City Beach, FL (US)

(72) Inventors: William D. McGinnis, Blairsville, GA (US); Randall J. Whitehead, Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/034,844

(22) Filed: Sep. 24, 2013

(51) Int. Cl.
*G05D 1/08* (2006.01)
*B66C 1/34* (2006.01)

(52) U.S. Cl.
CPC ........ *B66C 1/34* (2013.01)
USPC ........ 701/4

(58) Field of Classification Search
USPC ........ 701/1, 4, 50, 124
See application file for complete search history.

(56) References Cited

U.S. PATENT DOCUMENTS

| | | | | |
|---|---|---|---|---|
| 2009/0004004 | A1 * | 1/2009 | Vincenzi | 416/1 |
| 2009/0152391 | A1 * | 6/2009 | McWhirk | 244/30 |

* cited by examiner

*Primary Examiner* — Kim T Nguyen
(74) *Attorney, Agent, or Firm* — James T. Shepherd

(57) ABSTRACT

A control system and method for stabilizing a suspended mass in yaw on a single cable utilizing thrusters. In one embodiment rate gyroscopes are placed on the load and the thrusters are utilized so that the angular position converges to a selected or given angular position. The system implementation includes a pure loading case where cable spring and damping parameters are estimated as constants for the entire lift. The system implementation also includes a multi-height manipulation case where cable spring and damping parameters are determined from a look up table based on cable length.

14 Claims, 4 Drawing Sheets

CONTROL SYSTEM FOR STABILIZING A SINGLE LINE SUSPENDED MASS IN YAW

STATEMENT OF GOVERNMENT INTEREST

The invention described herein may be manufactured and used by or for the Government of the United States of America for governmental purposes without the payment of any royalties.

BACKGROUND OF THE INVENTION (1) Field of the Invention

The present invention relates generally to control systems for suspended objects and more specifically to a control system and method for stabilizing a single line suspended mass in yaw.

(2) Description of the Prior Art

Transporting objects suspended in air can be a difficult task, particularly when dealing with extreme weather conditions and harsh environments. These outside disturbances can greatly increase the risk of injury to those people charged with controlling the suspended objects, as well as bystanders in proximity to the suspended object. Furthermore, the load being moved is susceptible to damage as the outside forces alter the roll, pitch, and yaw of the suspended object.

Multiple cables may be utilized to lift loads and control spinning or yaw. However, controlling multiple lift cables adds greatly to system cost, complexity and maintenance, while reducing the maneuverability of the lifting mechanism. Further, the angular position of the load in this case is typically not readily adjustable and often must remain in a single orientation.

Torque balanced cables may be used to control yaw but are not resistant to disturbances from weather impacts or other outside forces. In extreme environments, a torque balanced cable will do little to resist changing yaw.

The problems discussed above are well known in the construction industry in dealing with transporting supplies from the ground to a point high above ground, e.g., a skyscraper, oil rig, and the like.

When dealing with operations at sea, such as Navy shipboard exercises, or private rescue operations for people and/or vessels, a wave slap event or excessive wind can cause the suspended mass to rotate multiple revolutions which in turn may cause severe damage to the fairings and, in extreme cases, the cables may be damaged beyond use.

U.S. Pat. No. 8,226,042 to Howell et al., issued Jul. 24, 2012, which is incorporated herein by reference, describes a spin control system that includes first and second thrusters coupled to an object hanging from a suspension member. When activated, the first and second thrusters generate thrust in opposing directions that are substantially perpendicular to the longitudinal axis of the suspension member. When the object spins, a controller activates at least one of the first and second thrusters to approximately align the object with a reference position.

While U.S. Pat. No. 8,226,042 teaches the basic equipment that could be utilized in a spin control system, the patent does not describe a control system that is effective in using the thrusters for controlling spin or yaw. The patent requires unspecified reference information or manual inputs that can be used to predict the spin rotation, which then determine which thruster to operate. The patent also assumes that the suspended equipment remains in a particular reference position that does not vary in pitch or roll, which can affect the working distance between the thruster and cable and the resulting amount of foot pounds of force produced by the thrusters. Moreover, the patent does not provide the factors involved in making a prediction of the anticipated direction of spin or method for responding without a prediction of anticipated direction of spin. Also, the patent does not teach any means to counteract environmental factors, cable spring and damping factors that affect spin and pitch changes, or system noise from the thrusters, winches, helicopter or other system noise that affects the ability of the control system to operate effectively for this purpose.

Accordingly, a need exists for an improved spin or yaw stabilization control system that can more effectively counter undesired rotation of a single cable suspended mass in yaw. Accordingly, those of skill in the art will appreciate the present invention which addresses the above discussed issues.

SUMMARY OF THE INVENTION

Accordingly, it is an object of the present invention to provide an improved control system and method for stabilizing a position of a suspended mass.

Another object of the present invention is to provide a control system and method for stabilizing a suspended mass that actively controls the yaw position of the mass with respect to a defined reference position.

Another object of the invention is to provide a control system and method for stabilizing a suspended mass that can allow careful angular manipulation of loads in tight spaces during lifting, as well as maintain a load in a steady position during inclement weather and harsh environments.

A further object of the invention is to provide an improved control system and method for stabilizing a suspended mass that requires only one suspension cable, which greatly reduces the required system complexity, cost and maintenance for the lifting mechanism.

Accordingly, the present invention comprises a control system for stabilizing a suspended load in yaw. The suspended load is subject to variable environmental disturbances acting on the suspended load that affect the yaw. In one embodiment, the invention may comprise a single suspension cable attached to the suspended load, at least one sensor is operable for measuring the yaw of the suspended load, and at least one thruster is affixed to the suspended load at a position laterally offset from the single suspension cable. The thruster is oriented to produce a force moment to stabilize the suspended load in yaw.

A control processing unit is operably connected with the sensor and the thruster. The control processing unit utilizes a control feedback loop to control the thruster to stabilize the suspended load in yaw. The control feedback loop may comprise at least one filter that receives data from the sensor.

The system may further comprise a user interface for interacting with the control processing unit that allows a user to input an estimate of the variable environmental disturbances.

The control system may further comprise a cable connection between the suspension cable and the load that results in pitch or roll of the suspended load during operation and may further comprise a sensor for measuring the pitch or roll. The control processing unit can be configured for determining differences in a force moment produced by the thruster as a result of the pitch or roll.

The suspension cable may have a variable length during operation whereby the suspension cable comprises a variable spring parameter and a variable damping parameter during operation. The control system can be configured to utilize at least one value for each of the variable spring parameter and the variable damping parameter for controlling the thruster.

In one embodiment, the control system assumes a constant value for each of the variable spring parameter and the variable damping parameter. Depending on the implementation, the constant value for each of the variable spring parameter and the variable damping parameter becomes more accurate as the variable length of the cable shortens.

In another embodiment, the control system may further comprise a cable length sensor and a lookup table. The control system can be configured to utilize the cable length sensor to select values from the lookup table for each of the variable spring parameter and the variable damping parameter based on a length of the suspended cable.

The cable length sensor may comprise at least one of an encoder or an accelerometer. A. low pass filter may be used to receive data from the cable length sensor.

In another embodiment, the sensor for measuring yaw of the suspended load may comprise a GPS sensor. The GPS sensor can be further configured to measure a length of the single suspension cable.

The filter in the feedback loop of the control system may comprise a software filter that is selectable between a Kalman filter and a low pass filter.

The system may further comprise a user interface operable for interacting with the control processing unit that allows a user to selectively change a selected yaw position of the suspended load during a lift.

In one embodiment, the yaw sensor comprises a rate gyroscope.

The system may further comprise a user interface for interacting with the control processing unit allowing a user to input at least one of a cable length, a load weight, or desired yaw position of the suspended load.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The proposed invention is a control system for a mass hanging from a single cable. By a single cable it is meant that the resultant force vector on the single cable is directed in a substantially single direction in line with the cable. A single cable may comprise multiple strands or groups of strands and may effectively comprise several cables intertwined together that direct the force generally in line with the cable. A single cable may typically utilize a single winch or group of pulleys or the like. Moreover a single cable may connect directly to a load or may connect with a harness comprising several different cables that are oriented in different directions whereby a single winch or the like is utilized for the lift. Different cables would be those that have different force vectors in different directions on different cables.

The system may be utilized with various lifting systems such as cranes and winches. Also, the winch may be mounted on a helicopter for lifting loads out of the water or off a hard surface. Control system 100 seeks to track a desired yaw orientation of the load ($\psi$) and prevent spinning of the load. The desired yaw orientation may or may not change with height depending on the lift requirements.

Figure 1:
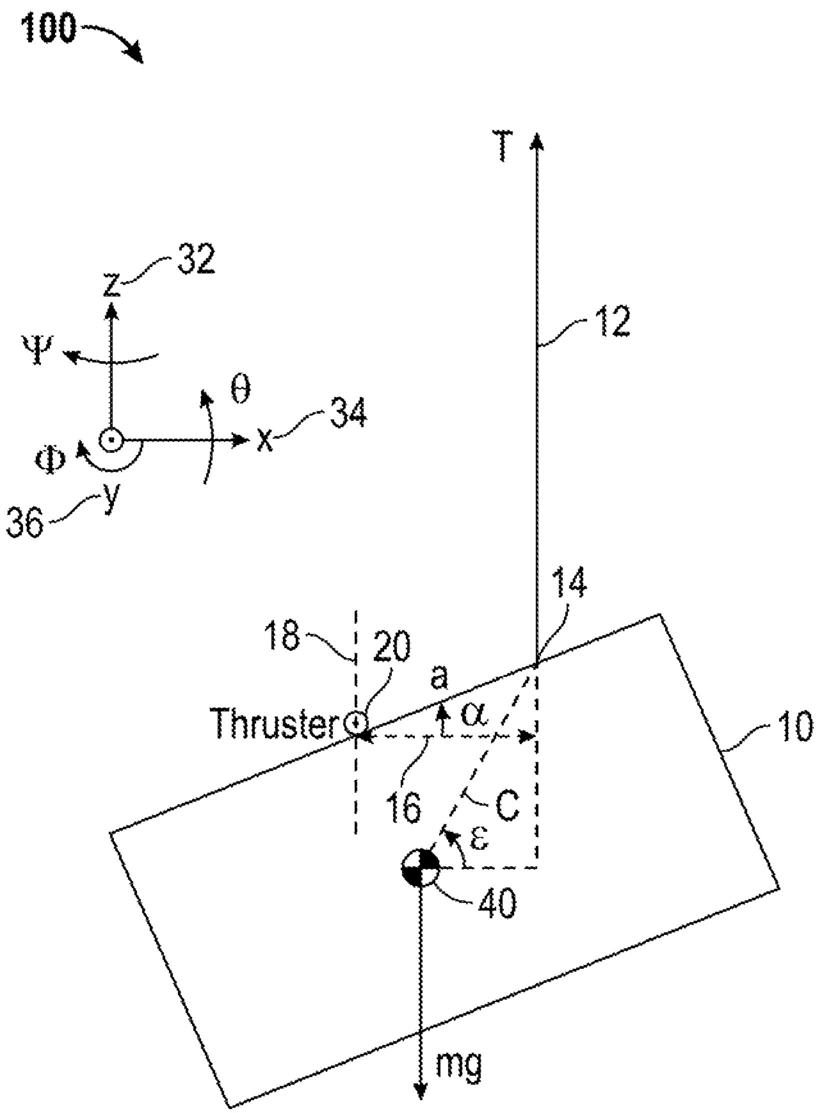
FIG. 1 is a diagram showing a generic free body suspended mass on a single cable in accord with one possible embodiment of the invention.

FIG. 1 shows a generic free body diagram of suspended load or mass 10 for use in generic control system 100. It can be seen that the only forces of the static system on a single cable 12 are in the Z direction 32. The tension on line or suspension cable 12 is the force mg (mass×gravity) created due to gravitational force. As mass or load 12 is accelerated upwardly or downwardly in the Z direction, force increases or decreases, and can also result in oscillation of the load due to the spring and damping constants of cable 12.

Significant spinning or yaw control problems can be created as a result of random disturbances that may act on suspended mass or load 10 in the Y axis direction 36 and/or the X axis direction 34 that affect pitch or roll (sometimes referred to herein as $\theta$ and $\Phi$), which may cause a moment in $\psi$ (yaw). The pitch and/or roll of the system due to oscillation of cable 12 may affect yaw and/or the force moment created by thruster system 20 and accordingly can be accounted for by the control system of the present invention.

Also of note is the relative location of thruster system 20 laterally with respect to cable 12. Knowledge of the location is important in the design of control system 100, and must be known for determining the force moment. As discussed herein, in some cases, movement of the load may cause changes in the force moment that should be accounted for.

Thruster system 20 may comprise one or more thrusters of various types, examples of which are shown in previously discussed U.S. Pat. No. 8,226,042. In that example, two thrusters pointed in opposite directions comprise electrically controlled turbines, which generate thrust that scales linearly with voltage. In another example, a single thruster with two open ends may be utilized where the rotor or blades are reversible. Other possible examples of thrusters may utilize compressed air or jets such as hydrogen peroxide rockets, which may be controlled with electrically controllable valves or the like. Depending on the type of thruster, a more complex transfer function for the thruster can be utilized. Moreover, the present invention could be modified to accommodate thrusters that also act to control pitch or roll, if desired.

For generic control system 100, the equation of motion is found by summing the moments in $\psi$:

$$\Sigma M_\psi = J_\psi \ddot{\psi} = b_\psi \dot{\psi} + k\psi + a\cos(\alpha)F + c\cos(\epsilon)D$$

In this example, F is the force output by thruster system 20, and D is the disturbances caused by the environment on line 12 and suspended mass 10. The distance along side "a" of mass or load 10, if at a pitch of angle α as indicated, may result in a parallel distance 16 of thruster 20 between cable 12 and a line 18 that runs through the center of thruster 20 and is parallel to cable 12, which distance can vary with the pitch. Likewise swinging of the cable may affect operation of the control system. Constants of the system include $b_\psi$ and k.

In one embodiment, suspended mass 10 can be assumed to be symmetric in all axes and isotropic, so center of mass 40 and the center of area are the same. In other cases, the force due to gravity will act through center of mass 40, and the disturbances due to wind or other environmental forces will act through the center of area which is exposed to the forces.

A yaw initial state or initial reference position for the yaw or quantity ψ can be determined based on initial positioning of the load. For example, the yaw initial state or reference state may be designated as the static orientation of mass or load 10 before the load is lifted by line 12. In this case, control system 100 must be active and measuring for a short time before load 10 is lifted to determine the initial state. Likewise, the desired reference position or desired yaw position for the load must be known relative to the initial state.

The yaw position and/or spin (ψ and derivatives thereof) can be measured with sensors 60 such as rate gyroscopes and/or other sensors. However, the invention is not limited to use of rate gyroscopes. In one embodiment, sensors 60 may comprise dual GPS hardware that could be utilized to determine not only true angular positioning but also to calculate the length of cable being used and/or the absolute height/location of the load.

In one possible embodiment, sensors such as inexpensive, lightweight, sturdy, low power requirement and compact rate gyroscopes are placed onto the mass or load that detect both yaw rotation (spin) and yaw angular orientation of mass or load 10. Sensors 60 can be used to measure the first derivative of ψ, which can then be integrated to find ψ. In most cases applicable to control system 100, the angular accelerations measured are expected to be relatively low, and because of this care can then be taken to select rate gyroscopes 60 with a smaller range of operation, e.g., less than 150 degrees per second, to avoid excessive quantization errors.

Because the moment created by thruster system 20 is a function of the parallel distance 16 to cable connection point 14 as seen in FIG. 1, if load 10 is expected to vary in Φ (roll) and/or θ (pitch), then pitch and/or roll must also be measured. Accordingly, sensors 60 may comprise different rate gyroscopes to measure pitch and/or roll.

For example, the measurement of pitch can be accomplished with sensors 60 in the same way as ψ such as with a rate gyroscope, but in the other axis. For a static load 10, the pitch is generally not anticipated to change significantly once load 10 is completely off the ground. However, if line 12 is fastened on one end of load 10, then the pitch will change drastically during the lifting process until load 10 is off the ground. This is important because the moment arm of thruster system 20 is greatly changed as a result of the pitch change. Oscillations due to cable stretch can also cause pitch changes.

Figure 2:
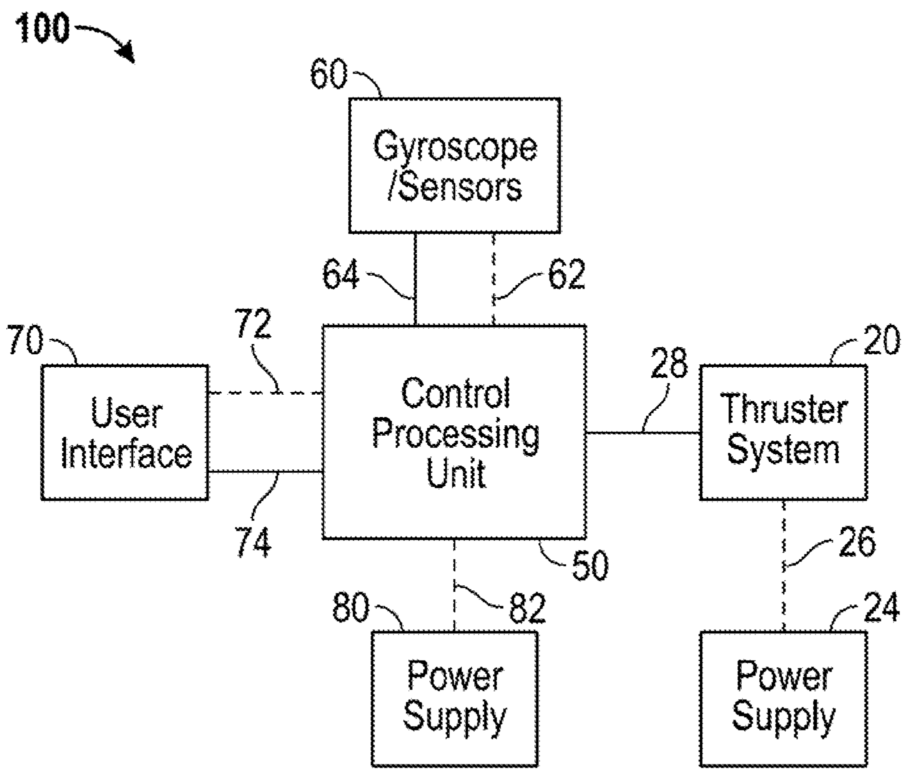
FIG. 2 is a diagram showing a hardware configuration of a control system for stabilizing a suspended mass in accord with another possible embodiment of the invention.

Referring now to FIG. 2, the hardware can be configured such that thruster system 20 and sensors 60 are run on separate power supplies with common grounds. In this example, thruster system 20 is powered by power supply 24 through power line 26 and operably connected with control processing unit 50 by data line 28. Sensors 60, such as one or more rate gyroscopes or other sensors discussed herein, are connected with control processing unit 50 by power line 62 and data line 64. Control processing unit 50 is powered by power supply 80 through power line 82.

Interacting with central control processing unit 50 is user interface 70 for selecting parameters such as weight and size of load 10, and the sensor package 60 containing gyroscopes or other sensors. User interface 70 connects with control processing unit 50 through dedicated data line 74 and dedicated power line 72. It will be noted that user interface 70 may also be wirelessly connected to interface 70 without the need for power connection. User interface 70 may provide further options for use, some of which are discussed herein.

Because gyroscopes and/or other sensors 60 are inherently noisy, and the signal must be integrated, there is potential for large errors to accumulate. If the disturbances are expected to be relatively light, such as from a light wind, then a Kalman filter is used in conjunction with the known system model to estimate the true position state based on measurements, which can be assumed to be noisy.

The lift requirements may involve a single or pure lift that lifts load 10 to a desired position. Alternatively, the lift requirements may involve multiple height lifts where load 10 is raised to a particular height or set of heights or may involve a relatively long lift. For the single or pure lift, the cable variables of interest such as spring and damping constants may be considered as one value as discussed below. However, for multiple lifts such factors may vary significantly enough to need special consideration.

Figure 3:
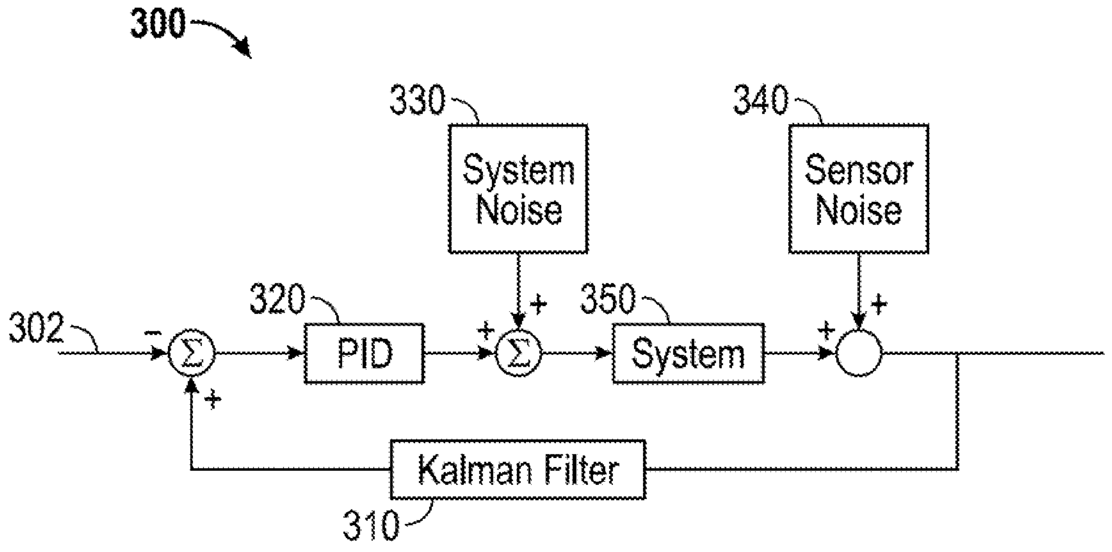
FIG. 3 is a block diagram depicting a controller feedback system for a control system for stabilizing a suspended load or mass in accord with another possible embodiment of the invention.

Referring to FIG. 3, in single lift control loop 300, the desired yaw position with respect to the reference position is provided as indicated at 302. If desired, the desired yaw position may be manually input with user interface 70 (see FIG. 2). In this embodiment, proportional-integral-derivate (PID) controller 320 utilizes the difference between an error signal and desired yaw position 302 to produce a control signal that includes system noise 330, which may comprise noise from the thrusters, winch, helicopter if used, cable stretch factors such as spring and damping, and other system noise. System 350 comprises thrusters that respond to the control signal plus noise. Sensors 60 measure the yaw position (or pitch or roll) and produce feedback that includes sensor noise 340. This feedback signal is applied to Kalman filter 310 that attempts to more accurately determine the correct sensor signal. Kalman filter 310 uses a recursive Bayesian analysis to determine a probable state based on the combination of a noisy measurement and a linearized estimate of load 10.

In cases where Kalman filtering is impractical, for example a multi-height manipulation case to be discussed hereinafter, simple low pass filtering and high quality sensors can be used as discussed with respect to FIG. 4.

As the difference in these two cases is preferably only in control software, the user can select which type of system to be used as discussed hereinafter with respect to FIG. 5, which shows a combined system utilizing user interface 70. The user may also input factors such as whether the expected disturbances acting on load 10 will be high or low utilizing user interface 70. An example of a low disturbance environment would be a construction site on a calm day. A high disturbance environment would be a coast guard helicopter lifting something out of the ocean during a storm, such as a person or a vessel.

With an accurate estimation of ψ, PID controller 320 can be implemented to operate control system 100, as shown in the block diagram for the basic system (pure lifting) depicted in FIG. 3.

The major concern with regard to linearization is the fact that the spring and damping parameters of cable 12 will change as mass or load 10 is lifted. It is normally expected that the spring constant will rise and the damping will fall as cable 12 is shortened and load 10 is raised.

For pure lifting cases, where load 10 is expected to be grabbed at the ground and lifted all the way up, PID controller 320 can be tuned to be optimal at the top of the lift, while remaining stable at the lower portion. This is effectively linearizing the non-linear lift system model about the highest possible position. As one example of such a system, the damping and spring parameters of cable 12 are measured when cable 12 is short, or at another desired position, and then it is assumed that those values remain constant. These parameters may also be obtained for standard cable sizes and materials by referring to already published or known data for the specific cable. If a constant cable parameter assumption is made, PID controller 320 design becomes a linear 2nd order system problem, with sensor noise 340 and system noise 330. System noise 330 may comprise noise of overall lifting and control system 350 such as thrusters, winch, and the like being accounted for when stabilizing load 10.

If the upper position of the lift is used as the parameter assumption as discussed above, load 10 may oscillate some amount at or near the bottom position, where the assumed values for spring and damping constants are less accurate. As load 10 rises, however, control system 100 will become more and more capable of steadying load 10, resulting in the desired correct orientation 302 near the end of the lift.

Figure 4:
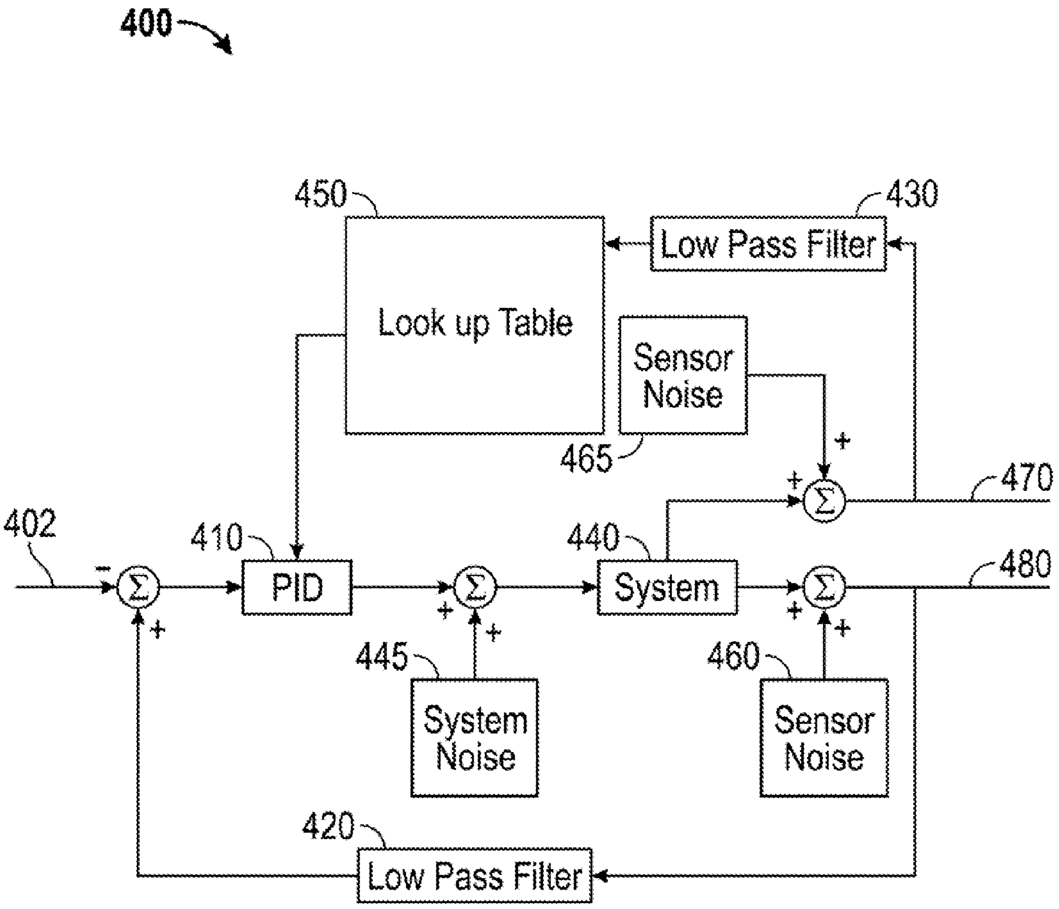
FIG. 4 is a block diagram depicting a controller feedback system for a controller used with multiple height manipulations for stabilizing a suspended load or mass in accord with another possible embodiment of the invention.

Referring now to FIG. 4, multi-level control loop 400 can be utilized for cases where suspended load 10 is manipulated at varying heights. For example, the desired orientation 402 may be changed at different heights to avoid obstacles. Accordingly, in this embodiment, it is preferable to track and account for the length of cable 12 being used. Experimentally, a function for spring and damping parameters can be determined for each given cable length, and based on the baseline values for cable 12 previously determined for the pure lifting case.

Various types of sensors such as accelerometers, encoders, GPS sensors, and the like can be utilized to determine cable length. In this example, acceleration 470 is measured to determine cable length.

With spring and damping parameters known for different cable lengths, PID controller 410 can be tuned for the whole of the possible range of cable lengths for cable 12 and my utilize finite sections for this purpose. Accordingly, the PID constants stored in lookup table 450 can provide damping and spring parameter for different lengths of cable 12. If the various system parameters are known, then the design of PIP controller 410 can be accomplished in control system software.

During operation and referring to FIG. 4, controller 410 utilizes the height based on sensors such as, but not limited to, an integrated accelerometer in the case of a stationary upper cable attachment point or rotary encoder at the cable coil if the upper attachment point is free to move. PID controller 410 accounts for system noise 445 generated by the overall lifting system 440. Detected signals such as pitch and yaw 480 can be determined by accounting for sensor noise 460 and then fed through low pass filter 420 before comparison with the desired reference position 402. Similarly, acceleration 470, if detected using an accelerometer, can be found by accounting for sensor noise 465 and then fed through low pass filter 430 to determine cable length. Finally, the appropriate values for k and b will be found by looking up the corresponding values for the PID parameters to create the control signal in lookup table 450 and sent back to controller 410.

Figure 5:
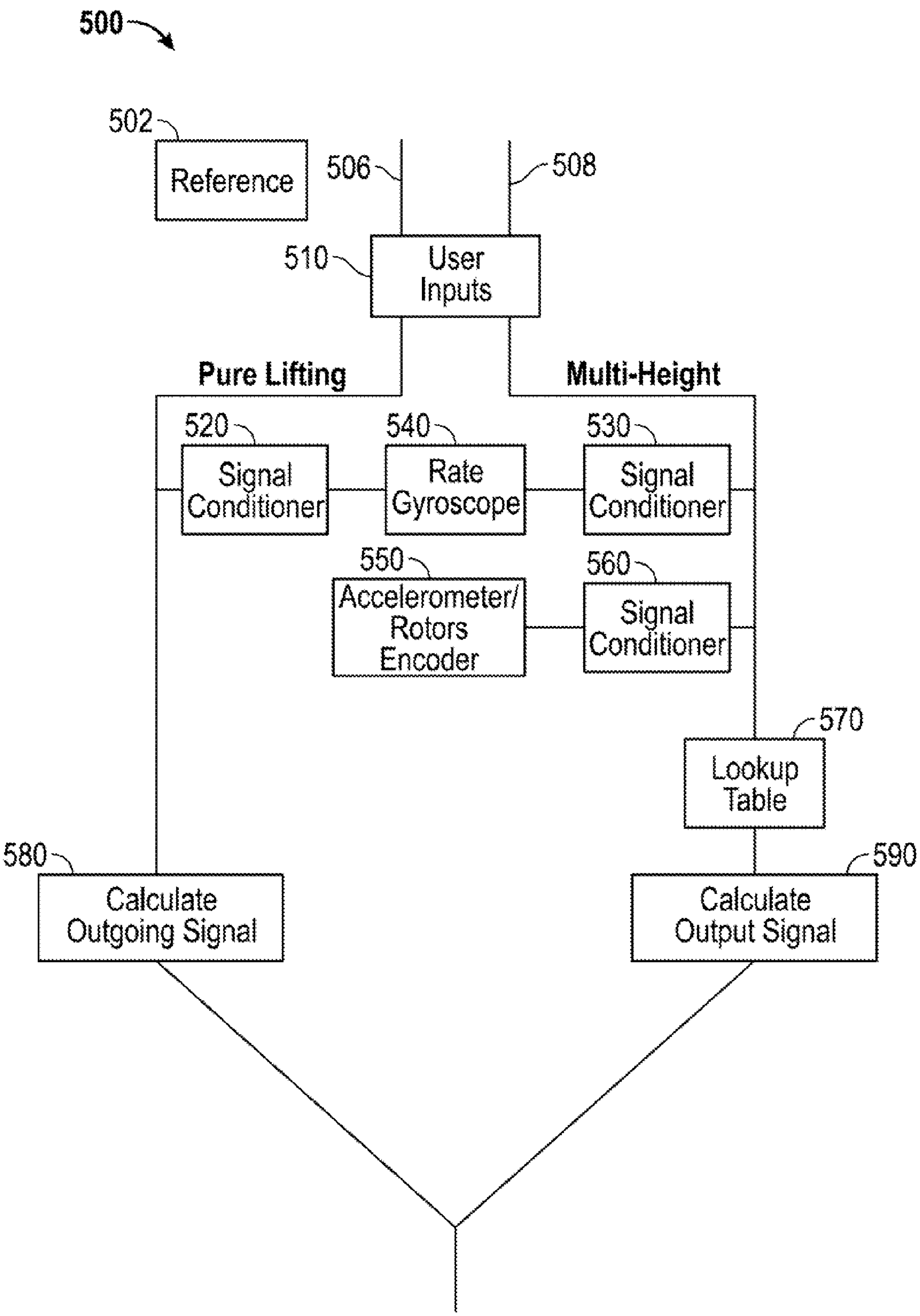
FIG. 5 is a flowchart depicting the software configuration of a control system for stabilizing a suspended mass in accord with another possible embodiment of the invention.

The control system 500 of FIG. 5 shows a combination of the control systems 300 and 400 discussed hereinbefore. The type of lifting case, either pure or single lifting scenario or multi-height lifting case is selected at 506. Measured parameters are provided at 508. Various other user inputs such as expected high or low environmental forces can be provided as part of user inputs 510. The desired position as compared to a reference position is provided at 502. For each case in yaw, the position of load 10 is found by rate gyroscopes at 540 and the signal conditioned at 520 and/or 530 to filter out signal noise and lift system noise. For the single or pure lift system, a control signal for the system is calculated at step 580 before being transmitted to the thruster system for stabilizing and/or manipulating suspended mass or load 10.

For the multiple height manipulation case, reference position 502 is established and a user selects the multiple height manipulation case at 506. Measured or selected parameters may be provided or input at step 508. Various other user inputs can be provided at step 510. The position of load 10 is measured by rate gyroscopes or sensors at step 540 and the signal conditioned at step 530. The length of cable 12 is measured by an accelerometer or rotary encoder at step 550 before being conditioned through a low pass filter at step 560. This signal is compared to the parameters input at step 510 in a lookup table for acceleration and theta values at step 570. Finally, an output signal is sent to the thruster system at step 590.

Accordingly, the control system is able to stabilize the suspended load rotation on the single cable with thrusters placed on the load that produce a force orthogonal to the cable. The thrusters are utilized to create a counter movement such that the angular positioning converges to a given reference or orientation of the mass or load.

The present invention contemplates system implementations for both a loading that is substantially effective as the length of the cable changes and also for multi-height manipulation cases where cable changes are substantial or that the suspended masses or loads may be better controlled with specific controls based on the different levels.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and many modifications and variations are possible in light of the above teaching. Such modifications and variations that may be apparent to a person skilled in the art are intended to be included within the scope of this invention as defined by the accompanying claims.

The invention claimed is:

1. A control system for stabilizing a suspended load in yaw, said suspended load being subject to variable environmental disturbances acting on said suspended load that affect said yaw, comprising:

a single suspension cable attached to said suspended load;

at least one sensor operable for measuring said yaw of said suspended load;

at least one thruster affixed to said suspended load at a position laterally offset from said single suspension cable, said thruster being oriented to produce a force to stabilize said suspended load in yaw; and a control processing unit operably connected with said at least one sensor and said at least one thruster, said control processing unit comprising a control feedback loop to control said at least one thruster to stabilize said suspended load in yaw, said control feedback loop comprising at least one filter that receives data from said at least one sensor.

2. The system of claim 1, further comprising a user interface for interacting with said control processing unit that allows a user to input an estimate of said variable environmental disturbances.

3. The control system of claim 1, further comprising a cable connection between said suspension cable and said load that results in pitch or roll of said suspended load during operation, and further comprising a sensor for at least one of said pitch or roll, wherein said control processing unit is configured for determining differences in a force moment produced by said at least one thruster as a result of said pitch or roll.

4. The control system of claim 1, wherein said suspension cable comprises a variable length during operation whereby said suspension cable comprises a variable spring parameter and a variable damping parameter during operation, said control system being configured to utilize at least one value for each of said variable spring parameter and said variable damping parameter for controlling said thruster.

5. The control system of claim 4, wherein said control system utilizes a single value for each of said variable spring parameter and said variable damping parameter.

6. The control system of claim 5, wherein said single value for each of said variable spring parameter and said variable damping parameter is based on a minimum value of said variable length of said cable.

7. The control system of claim 4, further comprising a cable length sensor coupled to said sensor and a lookup table, said control system being configured to receive cable length data from said cable length sensor and select values from said lookup table for each of said variable spring parameter and said variable damping parameter based on a length of said suspended cable.

8. The control system of claim 7, wherein said cable length sensor comprises at least one of an encoder or an accelerometer.

9. The control system of claim 7, further comprising a low pass filter for receiving data from said cable length sensor.

10. The control system of claim 1, wherein said at least one sensor for measuring yaw of said suspended load comprises a GPS sensor and wherein said GPS sensor is further configured to measure a length of said single suspension cable.

11. The control system of claim 1, wherein said at least one filter comprises a software filter that is selectable between a Kalman filter and a low pass filter.

12. The system of claim 1, further comprising a user interface operable for interacting with said control processing unit that allows a user to selectively change a selected yaw position of said suspended load during a lift.

13. The system of claim 1, wherein said at least one sensor comprises a rate gyroscope.

14. The system of claim 1, further comprising a user interface for interacting with said control processing unit allowing a user to input at least one of a cable length, a load weight, or desired yaw position of said suspended load.

* * * * *